March 29, 1949.  H. G. ROBINSON  2,465,399
ABRASIVE CUTOFF MACHINE
Filed Feb. 14, 1946  9 Sheets-Sheet 1

INVENTOR
Harry G. Robinson
BY
ATTORNEY

March 29, 1949.  H. G. ROBINSON  2,465,399
ABRASIVE CUTOFF MACHINE
Filed Feb. 14, 1946  9 Sheets-Sheet 3
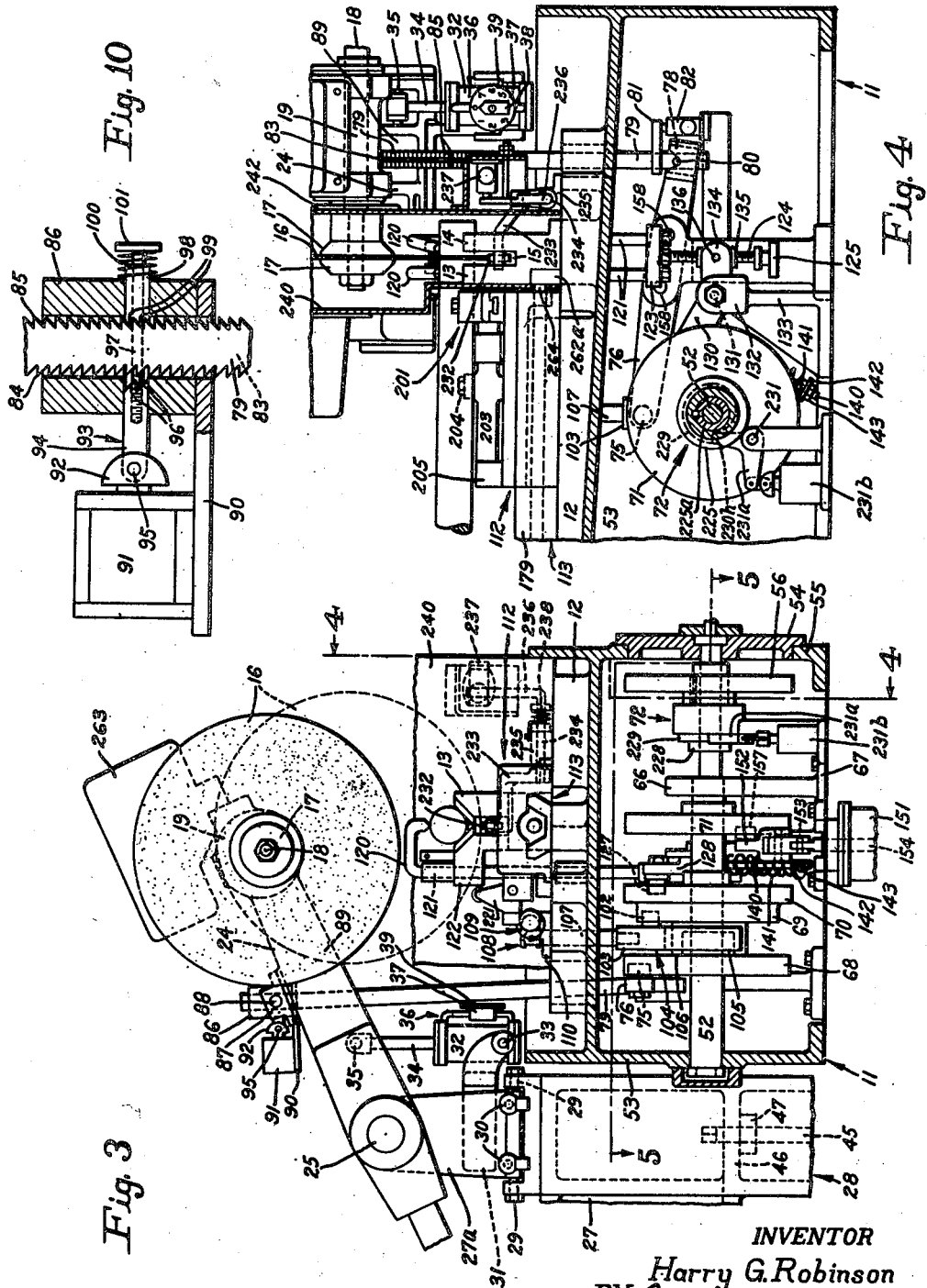
INVENTOR
Harry G. Robinson
BY
ATTORNEY March 29, 1949.  H. G. ROBINSON  2,465,399
ABRASIVE CUTOFF MACHINE
Filed Feb. 14, 1946  9 Sheets-Sheet 4

INVENTOR.
Harry G. Robinson
BY John P. Hanrahan
ATTORNEY

March 29, 1949.    H. G. ROBINSON    2,465,399
ABRASIVE CUTOFF MACHINE
Filed Feb. 14, 1946    9 Sheets-Sheet 5
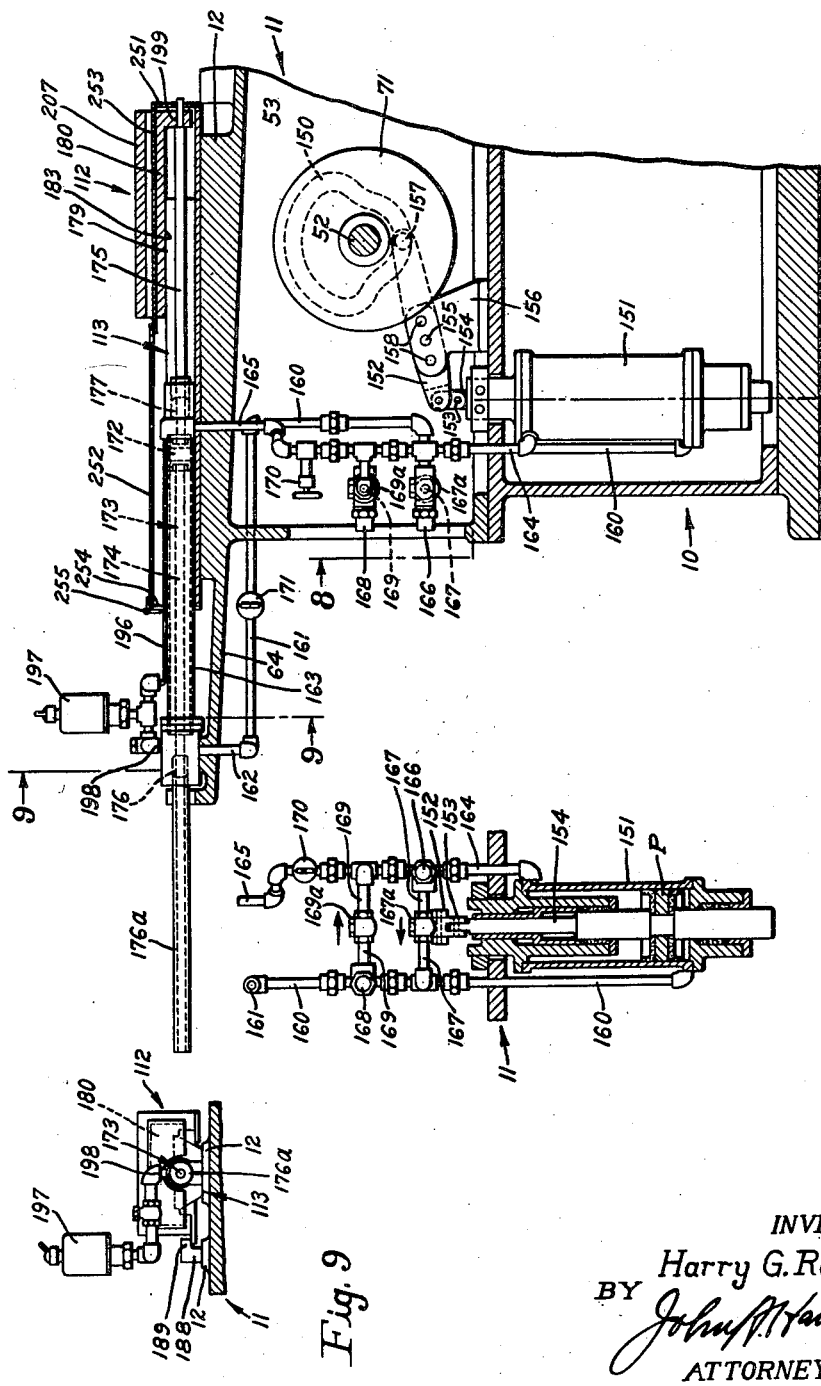
INVENTOR
Harry G. Robinson
BY John F. Hanrahan
ATTORNEY

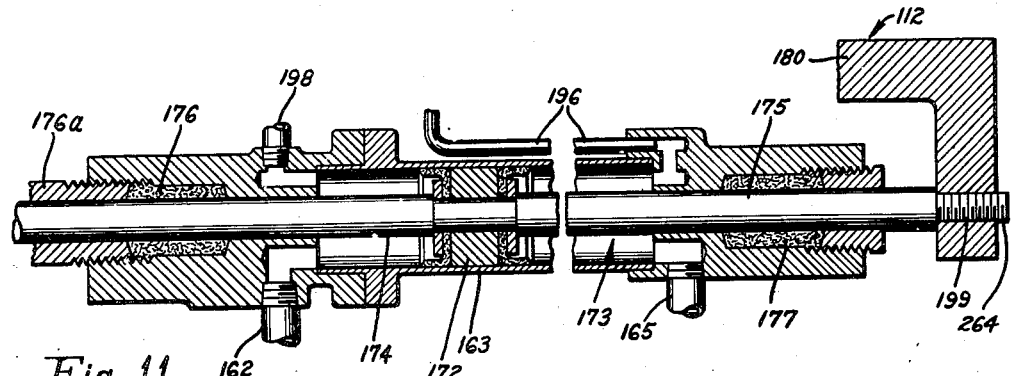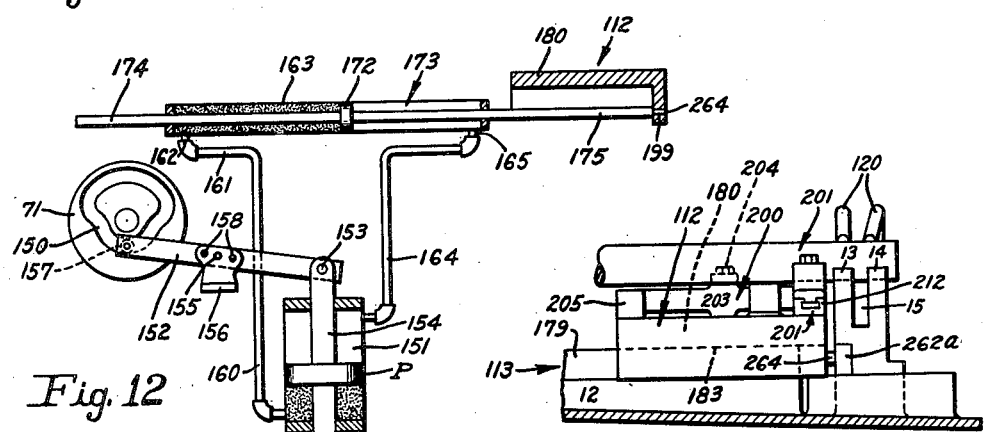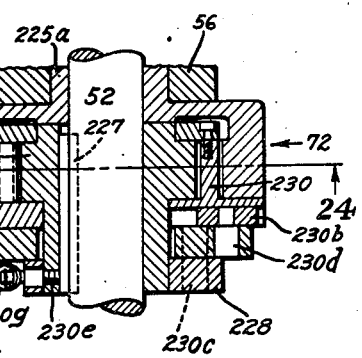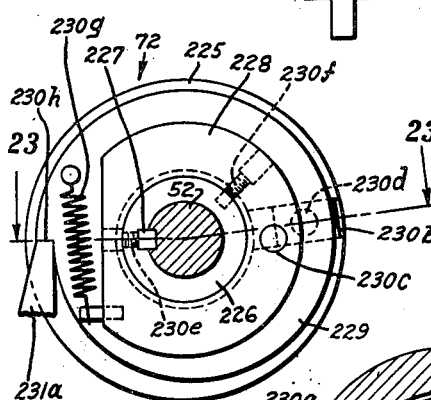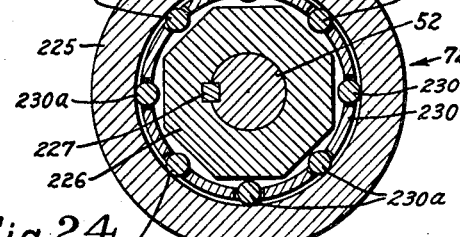
INVENTOR.
Harry G. Robinson
BY
ATTORNEY March 29, 1949.   H. G. ROBINSON   2,465,399
ABRASIVE CUTOFF MACHINE Filed Feb. 14, 1946   9 Sheets-Sheet 7

INVENTOR.
Harry G. Robinson
BY
John H Hanrahan
ATTORNEY

March 29, 1949. H. G. ROBINSON 2,465,399
ABRASIVE CUTOFF MACHINE
Filed Feb. 14, 1946 9 Sheets-Sheet 8

INVENTOR.
Harry G. Robinson
BY John F. Hanrahan
ATTORNEY

March 29, 1949.  H. G. ROBINSON  2,465,399
ABRASIVE CUTOFF MACHINE

Filed Feb. 14, 1946  9 Sheets-Sheet 9

INVENTOR.
Harry G. Robinson
BY
John H. Hanrahan
ATTORNEY

Patented Mar. 29, 1949

2,465,399

UNITED STATES PATENT OFFICE 2,465,399

ABRASIVE CUTOFF MACHINE

Harry G. Robinson, Stratford, Conn., assignor to American Chain & Cable Company, Inc., New York, N. Y., a corporation of New York Application February 14, 1946, Serial No. 647,511

30 Claims. (Cl. 51—98)

This invention relates to new and useful improvements in abrasive cut-off machines.

A primary object of the invention is to provide an abrasive cut-off machine particularly adapted for production work and which is automatic in its operation.

Another object is to provide in an abrasive cut-off machine means for effecting automatic adjustments to compensate for wheel wear.

A further object is to provide in an abrasive cut-off machine means for automatically feeding stock through the machine.

Other objects and advantages of the invention will become apparent from a consideration of the following detailed description taken in connection with the accompanying drawings wherein a satisfactory embodiment of the invention is shown. However, it is to be understood that the invention is not limited to the details disclosed but includes all such variations and modifications as fall within the spirit of the invention and the scope of the appended claims.

In the drawings:

Fig. 3 is a transverse sectional view through the upper portion of the machine, the view being taken as along the line 3—3 of Fig. 1, the guard or housing for the wheel being omitted;

Fig. 4 is a sectional view taken substantially along the plane of the line 4—4 of Fig. 3, the wheel guard being shown in section;

Fig. 7 is a vertical sectional view showing the means for feeding the work;

Fig. 8 is a sectional view as along the line 8—8 of Fig. 7;

Fig. 9 is a detailed sectional view taken as along the line 9—9 of Fig. 7;

Fig. 10 is a detailed view showing part of the means for adjusting the abrasive wheel to compensate for wear;

Fig. 11 is an enlarged sectional view showing the details of the hydraulic cylinder mechanism;

Fig. 12 is a more or less diagrammatical view showing the hydraulic operation;

Fig. 15 is a detailed elevational view showing the means for feeding the work and with the incline of the bed greatly exaggerated;

Fig. 22 is a front elevational view of a single revolution clutch employed;

Fig. 23 is a horizontal sectional view taken as along the line 23—23 of Fig. 22; and Fig. 24 is a vertical sectional view taken as along the line 24—24 of Fig. 23.

Figure 1:
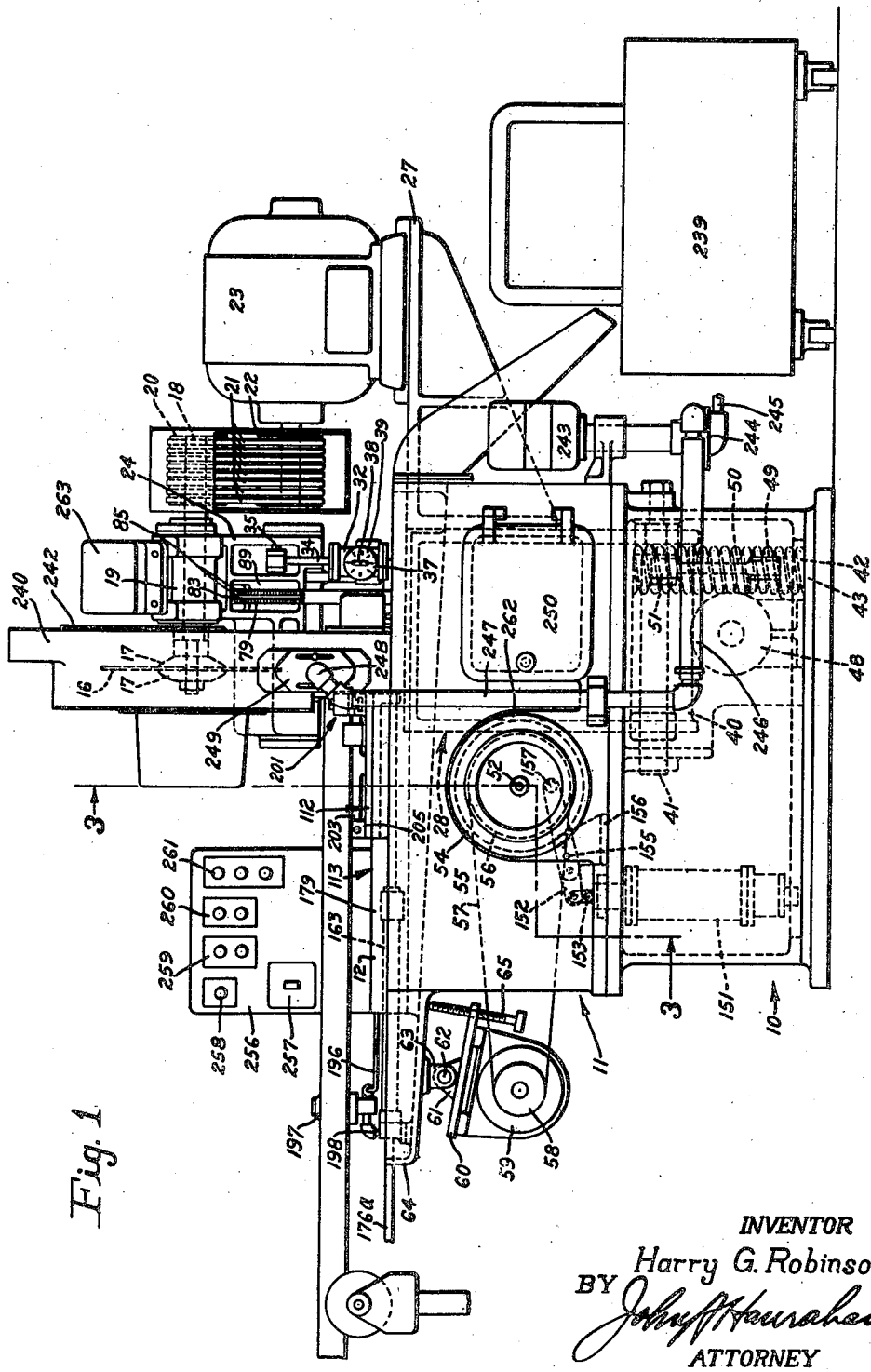
Fig. 1 is a front elevational view of an automatic cut-off machine constructed in accordance with the invention.

Referring in detail to the drawings, the machine of the invention includes a generally rectangular hollow base comprising a lower section 10 and an upper section 11 supported on said lower section. Obviously these sections may be bolted or otherwise secured together although no securing means is shown. Mounted on a bed 12 at the upper side of the base section 11 is a work holding means comprising a pair of V-blocks 13 and 14, each having a slot 15 extending transversely therethrough for the reception or passage of an abrasive cutting wheel 16 held by clamping means 17 and supported on an arbor or shaft 18.

Shaft 18 passes through a bearing on mounting means 19 and at its end remote from the disc or wheel 16 mounts a series of pulleys 20 driven by belts 21 also trained over pulleys 22 on the shaft of an electric motor 23. With this construction it will be clear that while the motor 23 is operating the abrasive wheel or disc 16 will be rotated. Bearing 19 is supported by the forward end of an arm 24 pivoted at 25 and provided with counter balancing weights 26. Motor 23 is suitably mounted on a bracket 27 attached to or formed with a movable post 28 and the shaft of said motor is actually aligned with the pivot 25 whereby the motor may continue to drive the disc 16 as the arm 24 is rocked about the pivot 25 for the purpose later to be described.

Pivot 25 is mounted by the upper end portion of a bracket 27a in turn mounted on the upper end of the hollow post 26. The bracket 27a is adjustable on the upper end of the post 26 by adjustment of the screws or bolts 29 so as to align the pivot 25 with the shaft of motor 23 and is further adjustable laterally on manipulation of the bolts 30 to so position the parts that the cut-off wheel 16 is aligned with the slot or kerf 15 of the V-blocks.

Additionally, bracket 27a carries an arm 31 bifurcated at its outer end and straddling the cylinder 32 of a dash pot means. Such cylinder is pivotally mounted on the arm 31 by pivot means 33 (see Fig. 3) and the upper end of the rod 34 of such dash pot means is pivoted at 35 to the arm 24. In a piping arrangement, generally designated 36, between the upper and lower ends of the dash pot, a control valve 37 is adjustable by manipulation of a pointer 38 on the forward face of an indicator dial 39 whereby to control the rate of flow of fluid from one end to the other of the dash pot whereby the latter acts as a restraining or cushioning means for the arm 24 and parts carried thereby.

Figure 2:
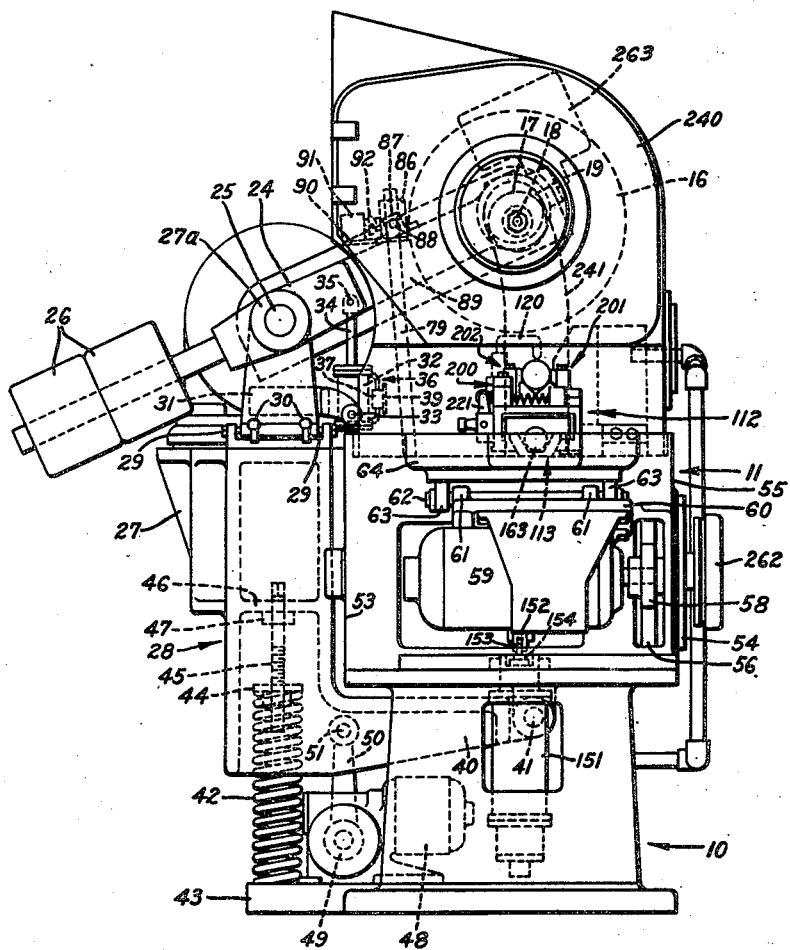
Fig. 2 is an end elevational view of the machine, the view being taken as looking from the left in Fig. 1.

Post 28 is substantially L-shaped and its lower or foot portion 40 (see Fig. 2), is carried forwardly into base section 10 and pivoted as at 41. A heavy coil spring 42 has one end against a block or foot portion 43 comprising part of base section 10 and has its other end bearing against a plate 44 on the lower end of a threaded rod or bolt 45 passing through a web portion 46 of the post 28. A ring or shoulder 47 on the bolt is kept against the underside of the web 46 by the action of the spring 42 and it will be clear from Fig. 2 that the spring 42 is constantly tending to move the vertical post portion upwardly in a manner to cause the entire post to rock about the pivot 41.

Also in base section 10 is an electric motor 48 serving to drive an eccentric means 49 which through an arm or link 50 is pivoted to the post 28 at 51. With this arrangement it will be clear that when the motor 48 is operating the link or pitman 50 will be constantly urging the post upwardly and downwardly rocking it on the pivot 41. The spring 42 assists in imparting upward movement to the post and the result of such movement of the post is that the disc 16 is given a movement crosswise with respect to the machine and particularly with respect to any work on the V-blocks.

The general cut-off machine structure as above described is disclosed in my Patents 2,262,049 and 2,358,880 of November 11, 1941, and September 26, 1944, respectively.

Mounted in the bed section 11 and extending transversely thereof is a cam shaft 52. At one end this shaft has bearing in a wall portion 53 of the base section and at its other end has bearing in a removable bearing plate 54 mounted in an opening in the wall 55 of said base section. A pulley 56 near one end of the shaft 52 is driven by a belt 57 also trained over a pulley 58 on the shaft of a motor 59 supported on the lower side of a mounting plate 60. This plate in turn is provided with ears 61 pivoted on a shaft or bar 62 supported by ears 63 attached to or formed with the underside of an extension 64 of base section 11.

By the described construction motor 59 is pivotally mounted and it may be adjusted so that the proper tension is maintained in the drive belt 57. For the purpose of adjustment a screw 65 is shown as passing through a portion of the plate 60 and adjustable against the underside of extension 64. In addition to the end bearings described, cam shaft 52 has an intermediate support in the form of a post or upright 66 carried by base plate 67 bolted or otherwise suitably secured in place.

On the shaft 52 are a series of cams comprising briefly a cam 68 to impart return movement to the disc 16, a cam 69 controlling opening and closing of the work clamping means of the work feeding mechanism, a cam 70 controlling the work clamp associated with the V-blocks, a cam 71 operating the pump means for supplying fluid under pressure to the work feeding mechanism, and a one revolution clutch device 72.

Cam 68 (see Fig. 18) has a path 74 in which enters a pin or roller 75 rigid with one end of a rocker or arm 76 which latter is pivoted at 77 and in its shorter end portion has an opening 78 through which passes the lower end of a rod 79. A pin 80 extended transversely of said rod limits the movement of the rod through the arm opening 78. Additionally, a finger-like piece 81 is carried by the lower end of the rod 79 and is positioned to operate a micro switch 82 at predetermined times as will later appear.

The upper portion of the rod 79 (see Fig. 4) has a slot 83 therethrough and in its opposite edges (through which edges said slot opens) is provided with series of teeth 84 and 85 (see Fig. 10). Additionally, such upper portion of the rod passes through a tubular collar-like piece 86 located at the upper side of the arm 24 and pivotally mounted on a pair of ears 87 as by the pin 88.

Ears 87 are rigid with the arm 24 which latter has a slot 89 (Figs. 1 and 4) through which the rod 79 passes. Fixed to the member or collar-like piece 86 is a laterally extending plate 90 (Fig. 10) supporting a solenoid 91, the head 92 of the core or plunger of which is attached to a device generally designated 93 and serving to lock the structure 86 to the rod 79 and also to provide for adjustment of said rod through the arm 24 whereby to control the extent of the upward and downward movements or the rocking movement of said arm about the pivot 25 which movements are concerned with the cutting of work, as will later become clear.

The control of the solenoid 91 will later be set forth but here it is pointed out that the means 93 comprises a bar-like portion 94 pivoted to the solenoid core at 95 and at its opposite end having a pair of teeth 96 located one above the other. A rod 97 is threaded into the toothed end portion of the bar 94 and passes through the slot 83 in the rod 79 and at the side of said rod opposite the bar 94 mounts a second bar 98 having teeth 99 on its forward end. A coil spring 100 bears at its inner end against an outer surface of the collar-like member 86 and at its outer end against a head 101 of the threaded member 97. Thus this spring is constantly tending to shift the entire means 93 toward the right as viewed in Fig. 10.

When the solenoid 91 is energized it operates to shift the means 93 in the opposite direction against the action of the spring 100 and to the position of Fig. 10. The teeth 85 are offset one-half the width of a tooth with respect to the teeth 84. Therefore (with respect to Fig. 10) when the solenoid 91 is deenergized the spring 100 will shift the device 93 so that as the teeth 99 move from engagement with the teeth 85, the teeth 96 will enter into engagement with the teeth 84 but this shift will permit the bar 79 to move downwardly through the device 86 to the extent of a distance equal to one-half the width of one of the teeth of the bar.

From the foregoing it will be understood that when the solenoid was first energized and it moved the teeth 96 from engagement with the teeth 84 and the teeth 99 into engagement with the teeth 85 the bar 79 was permitted to move through the means 86 a distance equal to one-half the width of any tooth of the bar 79. Thus for each time the solenoid is energized and then de-energized, an adjustment equal to the width of one complete tooth is effected. An adjustment equal to the extent of one-half a tooth is effected as the solenoid acts to shift the device 93 and a similar adjustment is effected when the spring 100 acts as the solenoid is deenergized.

Figure 18:
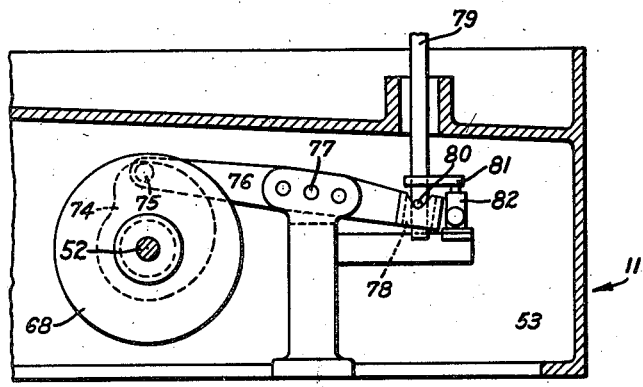
Fig. 18 is a detail sectional view showing the control and operating means for the cut-off wheel feeding means.
Figure 19:
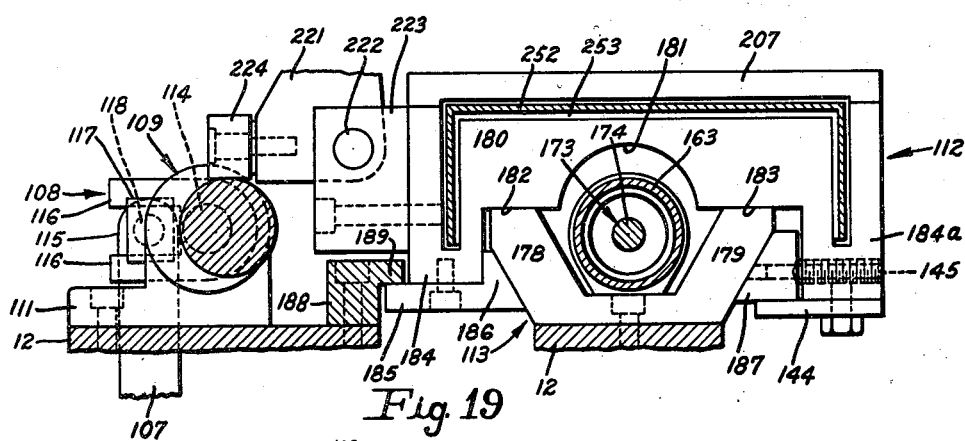
Fig. 19 is a view somewhat similar to Fig. 14 but with the stop omitted.
Figures 20, 21:
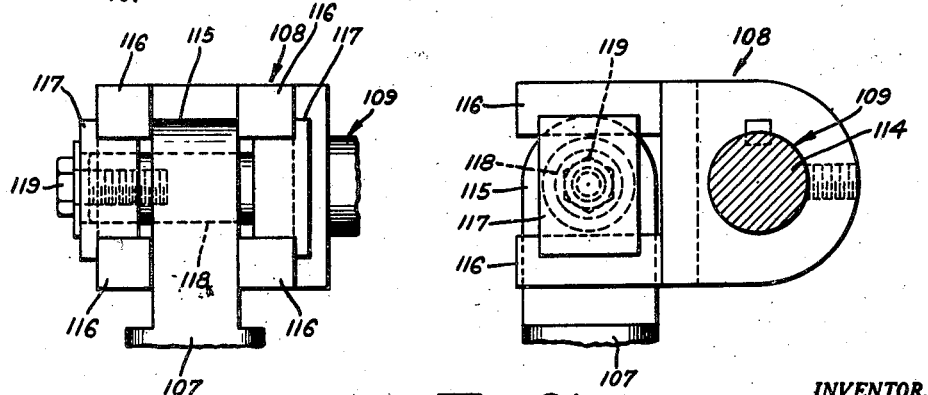
Fig. 20 is a rear elevational view of the cam controlled means for releasing the work holding means.
Fig. 21 is a side elevational view of the parts shown in Fig. 20.

In the operation of the machine the disc 16 is fed downwardly by gravity and is raised by the rod 79 actuated by the cam 68 through the bar or lever 76 (see Fig. 18). Downward movement of the rod 79 (and thus of the arm 24 and disc 16) is limited by the lever 76 as the latter is controlled by the cam 68. Therefore in a cycle of operation of the machine, following energizing and deenergizing of the solenoid 91, the center of disc 16 will move closer to the V-blocks than during the machine's cycle of operation immediately preceding operation of the solenoid. This additional increment of movement of the disc is to compensate for wear in the latter as will later more fully appear.

Figure 14:
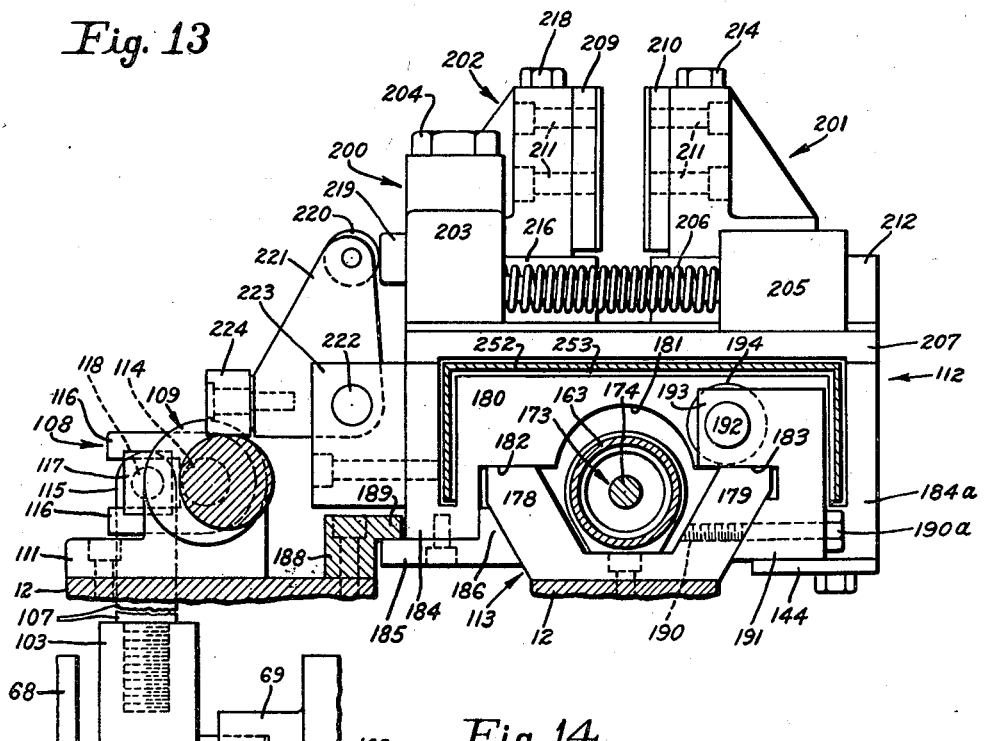
Fig. 14 is an enlarged sectional view taken as along the line 14—14 of Fig. 13, and showing details of the work feeding means.
Figure 16:
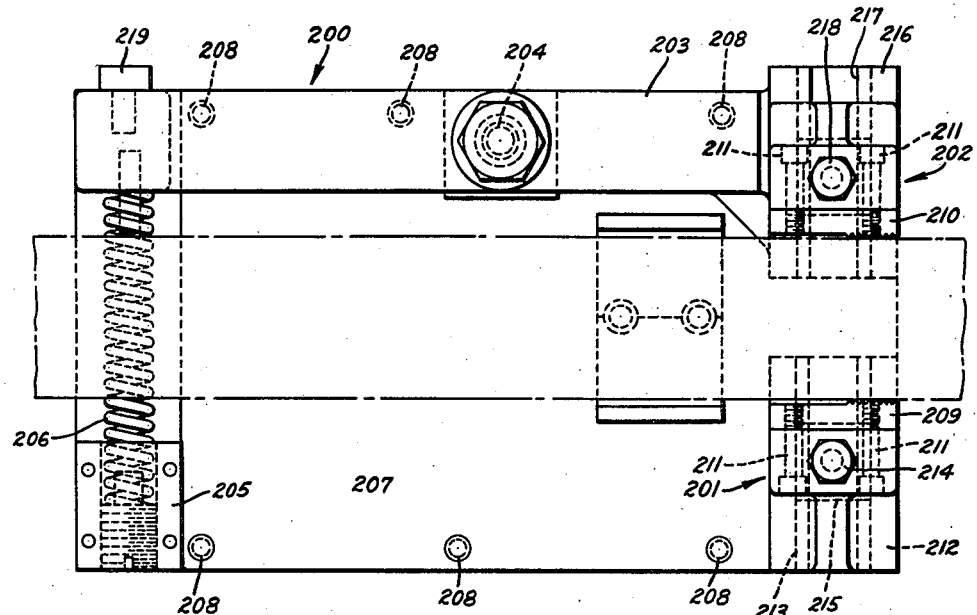
Fig. 16 is an enlarged top plan view of the work gripping means.
Figure 17:
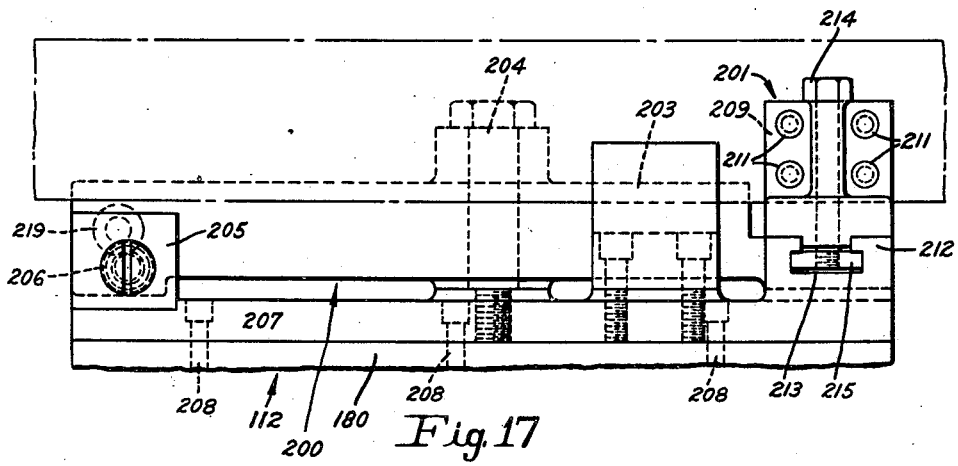
Fig. 17 is a side elevational view of such means, on the scale of Fig. 16.

Cam 69 (see Fig. 14) is also a path cam and a roller or pin 102 located in the path of said cam is carried by the upper arm 103 of a fork device generally designated 104 and which fork device has its yoke or bifurcated portion 105 straddling and guided by a concentric roller 106 on the shaft 52. Clearly as the cam 69 is turned it will impart upward and downward movement to the device 104 and the latter has its upper arm on body 105 connected in any suitable manner to a push rod 107.

This push rod 107 (see Figs. 3, 13, 14, 19, 20 and 21) at its upper end is connected with a head 108 secured to one end of a round rod or shaft 109 mounted on bearings 110 and 111 and located at one side of a slide 112 movable on a way 113 and adapted for the feeding of work to and from the V-blocks 13 and 14. The body of bar 109 is eccentric with relation to its reduced end portions 114 located in the bearings 110 and 111 and the rod 107 is connected with the head 108 in eccentric relation to the body 109. Therefore, it will be understood that as the rod 107 is moved upwardly the body 109 is given a turning movement about an eccentric axis comprising the bearing ends 114 and the purpose of this arrangement will later be fully set forth.

Rod 107 is connected with the head 108 through a pivotal and slide construction. To this end (see particularly Figs. 20 and 21) the upper end portion 115 of the rod enters between spaced portions 116 of the head. A pair of blocks 117, slidable in parallel aligned slots in portions 116, are connected by a shaft or pivotal bar 118 integral with one of said blocks and passing through rod portion 115. A screw or similar means 119 serves to connect pivot bar 118 with the other block and to tie the blocks together. With this construction as the push rod 107 is moved up and down it may pivot on bar 118 and in order that the push rod may have a straight path of movement the pivot may shift, by movement of the blocks 117, as the head 108 tilts or rocks.

Figure 5:
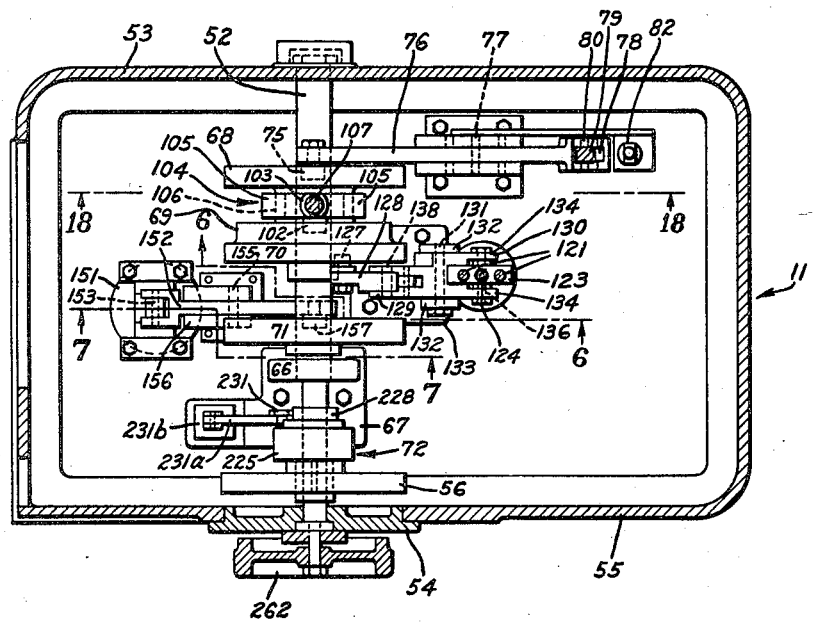
Fig. 5 is a horizontal sectional view taken as along the plane of the line 5—5 in Fig. 3.
Figure 6:
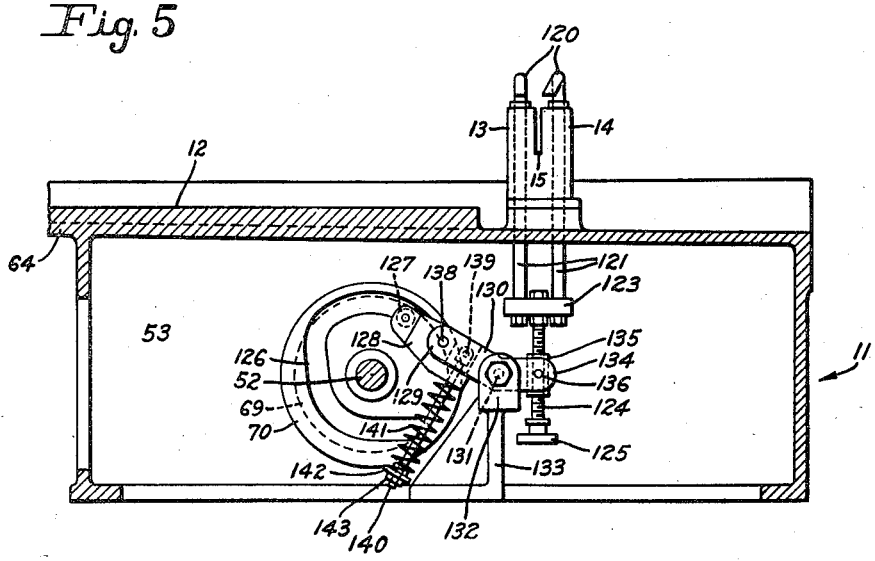
Fig. 6 is a vertical sectional view taken as along the plane of the line 6—6 of Fig. 5 and showing the means for operating the work clamps.
Figure 13:
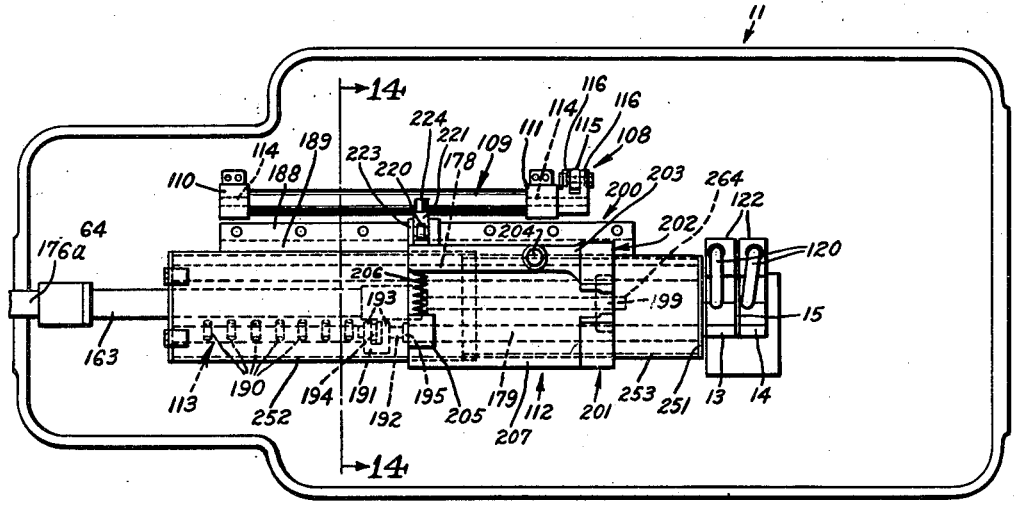
Fig. 13 is a top plan view showing the means for feeding the work and clamping it in position.

Cam 70 (see Figs. 3, 5 and 6) operates a pair of work clamps 120 comprising a pair of hook-like ends formed by bending over of the upper end portions of a pair of rods 121 passing through the bed 12 and also through extensions 122 of the V-blocks. At their lower ends rods 121 are secured in or to a head 123 to which is also attached the upper end of a bolt or threaded rod 124 having a manipulating head 125 for turning. This rod or bolt is free to turn in the head 123 but is not threaded to such head and is held against movement through the head.

Cam 70 has a path 126 in which is located a roller 127 on one end of an arm 128 entering the bifurcated portion 129 of a sort of bell crank 130 which is in turn pivoted at 131 between the ears 132 of a bracket 133 formed with or attached to the base section 11. At its forward end bell crank 130 is bifurcated and its bifurcated portions 134 are arranged at their respective sides over a collar or sleeve 135 through which the bolt 124 is threaded and such bifurcated portions are pivotally fastened to such collar or sleeve as by pivot means 136.

Between its ends the bell crank is pivoted at 131 to the bracket 133 and between its ends the arm 128 is pivoted at 138 between the ears 129 of the bell crank. Inwardly of pivot 138 arm 128 is pivoted at 139 to a rod 140 about which is arranged a coil spring 141 bearing at one end against the inner portion of the arm 128 and at its other end against a washer or head 142 adjustable along the rod 140 by nut 143 threaded to the rod.

With this arrangement as the cam 70 turns roller 127 is moved vertically and acting through the arm 128 rocks the bell crank 130 on the pivot 131 so as to move the rods 121 and thus the clamp fingers 120 upwardly and downwardly with respect to the V-blocks. The throw of the cam is of course constant and by adjusting the bolt or threaded rod 124 the distance of movement or the stroke of the clamping fingers may be controlled. However, the most pressure that the clamping fingers may be caused to place on any work in the V-blocks is a pressure less than that which will compress the spring 140. Thus, as there is a variation in the size of the work being fed, when the fingers 120 engage the work and the cam continues moving the roller 127 upwardly for the purpose of pulling the clamps downwardly, beyond a certain predetermined pressure, the spring 141 will yield and the arm 128 will rock on the pivot 138 so that there will be no breakage or bending of the parts and only the predetermined pressure will have been placed on the work. It will be clear that by adjusting the nut 143, the amount of this pressure may be varied.

The cam 71 (see Figs. 3, 7 and 12) is provided with a path 150. This cam serves to actuate a piston P located in the cylinder 151 whereby to provide fluid under pressure for operating a work carrying slide. To the desired end a lever 152 has one end pivotally connected at 153 to the upper end of a piston rod 154 the piston P of which is located in the cylinder 151. Intermediate its ends arm 152 is pivoted as at 155 onto a bracket 156 and at its end remote from the piston rod mounts a roller 157 located in the cam path 150.

As shown, bracket 156 is provided with a series of openings 158 and obviously the pivot pin 155 may be located in any one of these openings whereby to control the throw of the lever 152 and the extent of movement of the piston rod 154.

From the lower end of cylinder 151 a pipe 160 extends upwardly and at its upper end is connected with a horizontally disposed pipe 161 (see Fig. 7) having its end portion or connecting pipe 162 entering one end of a horizontally disposed cylinder 163. The upper end portion of cylinder 151 has connected thereto a vertically disposed pipe 164 having its upper end portion 165 communicating with the other end portion of cylinder 163.

Through a safety by-pass valve 166 a short piece of pipe 167 provides communication or a passageway from an intermediate portion of the pipe 164 to the intermediate portion of the pipe 160 while somewhat similarly, through a safety by-pass valve 168, a short pipe 169 provides communication from an intermediate portion of pipe 160 to an intermediate portion of pipe 164. A valve 170 provides means for controlling or cutting off communication through pipes 164 and 165 and somewhat similarly a valve 171 located in the horizontal pipe 161 controls or cuts off flow of fluid through such pipe. In the short communicating pipes 167 and 169 are check valves 167a and 169a, respectively.

Within the cylinder 163 is a piston 172 (see Figs. 7 and 11) mounted by a piston rod 173 including portions 174 and 175 passing through stuffing boxes 176 and 177 at the respective ends of the cylinder 163. Cylinder 163 is located (Figs. 14 and 19) between the arms 178 and 179 of the way 113 located on the upper side of the bed 12 and mounting the slide 112. Slide 112 includes a body 180 having a cut-out or recess portion 181 to span the cylinder 163 and at opposite sides of said cut-out or recess portion includes surfaces 182 and 183 resting on or bearing on the upper surface of the arms 178 and 179 respectively.

Fixed to a depending portion 184 of the slide body is a device 185 including a head-like portion 186 having a bevelled surface engaging the outer bevelled surface of the arm 178. At the outer side of the way 113 slide 112 includes a depending portion 184a mounting an adjustable gib 187 shaped to underlie the outer inclined surface of the arm 179 of the way. In this construction the gib 187 is held in place by a support 144 and adjustable screw 145. Thus gib 187 may be adjusted to compensate for wear and it, together with device 185, serves to hold the slide to the way for movement therealong.

A rib 188 on the bed 12 includes a portion 189 overlying the outer end of the member or device 185 whereby the entire slide is held against any tendency toward a vertical movement. Arm 179 of the way 113 is provided with a row of suitably spaced tapped openings 190 into any of which may be threaded a bolt 190a passing through a bracket 191 (see Fig. 14) carrying a stop device 192 in the form of a screw passing through a bifurcated portion 193 of the bracket and between the arms of such bifurcated portion mounting a wheel 194. This wheel is threaded to the screw 192 but cannot move along the latter because of the position of the wheel between the arms of the bifurcated portion of the bracket. Therefore on turning of the wheel the screw will be longitudinally adjusted.

This described construction of the wheel and screw provides for micrometer adjustments of the stop which actually comprises an enlarged or head-like portion 195 of the screw. For coarser adjustments the bolt 190a is threaded into a selected one of the tapped recesses 190 in the arm 179, the bracket 191 and parts mounted thereon being positioned depending on the opening into which the bolt is threaded. The manner in which the stop functions will later be set forth in detail.

From the upper side of one end portion of cylinder 163 a relatively small diameter pipe or tube 196 communicates with an oil cup or bottle 197 located well above any other portion of the hydraulic system. From this bottle or cup 197 a pipe 198 communicates with the other end portion of the cylinder 163. At its outer end the portion 175 of piston rod 173 is connected with the slide 112 as at 199 (see Fig. 11). The end portion 174 of the piston rod is constantly within the packing nut 176a which, as shown in Fig. 7, includes a relatively long tubular portion forming a guard for the said portion of the piston rod.

Therefore, as the cam 71 is rotated and shifts the piston P downwardly in the cylinder 151, fluid under pressure passes upwardly through the pipe 160 and pipes 161 and 162 to one end of cylinder 163 and engaging the piston 172 within such cylinder forces the same in one direction in the cylinder as toward the right in Figs. 7 and 11. The piston rod being connected with the slide 112 the latter is moved along the way 113 or in the direction of the V-blocks and the cutoff wheel. Any excessive pressure developed in the hydraulic system will be by-passed through the valve 168 and pipe 169 to the pipe 164 and thus returned to the upper end of the cylinder 151.

As the cam 71 continues to turn reverse movement is imparted to the piston P of cylinder 151 and fluid is forced through the pipes 164 and 165 into the right hand end portion of cylinder 163 and thereupon the piston 172 is shifted towards the left in said cylinder imparting a corresponding movement to the slide 112. Should an excessive pressure be built up the same, through the medium of the valve 166 and pipe 167, will be by-passed from pipe 164 over to pipe 160 and immediately returned to the lower end of the cylinder 151. As the slide reaches the limit of its movement toward the left it will engage the head 195 of the screw 192 and be held against further movement. Should this engagement take place prior to the completion of the stroke of piston P the fluid under pressure will merely be by-passed through valve 166 and pipe 167 back to the lower end of the cylinder 151 through the pipe 160.

On the upper side of the slide 112 is a work clamp generally designated 200 and (see Figs. 13, 14, 16, and 17) comprising a fixed block 201 and a movable block 202, the latter being fixed on an arm 203 pivoted to the upper side of the slide as at 204. Pivot 204 is located intermediate the ends of arm 203 and between the other end of said arm and a fixed block 205, also on the upper side of the slide 112 is a relatively heavy coil spring 206. Clearly this spring is constantly tending to rock the lever 203 about the pivot 204 to carry the block 202 towards the block 201. The described parts of work clamp 200 are all mounted on a plate 207 secured to the slide 112 as by screws 208.

Replaceable jaws 209 and 210 respectively are fixed to the opposing surfaces of the blocks 201 and 202 by bolts 211. In turn the block 201 is adjustable toward and from the block 202 and the latter is similarly adjustable with respect to the former. To the desired end block 201 is disposed on a pad 212 (Figs. 16 and 17) having a T-slot 213 opening through its upper side and a bolt 214 passing through the block is threaded into a nut 215 in said slot. Block 202 is disposed on a head part 216 of the arm 203 and the latter has a T-slot 217 opening through its upper side. A bolt 218 passing downwardly through the block 202 is threaded into a nut (not shown) in the slot 217. Clearly, on loosening of the bolts 214 and 218 the blocks 201 and 202 may be adjusted along the slots 213 and 217.

On the outer side of the free end portion of arm 203 is a head 219 constantly engaged by a roller 220 and the upper end portion of a bell crank arm 221 pivotally mounted as at 222 on a lateral extension 223 of the slide 112. The lower end of this bell crank mounts a roller 224 constantly engaging with the eccentrically mounted bar 109 previously referred to. With this arrangement, it will be seen that when said bar is rocked on its eccentric mounting, as to the position of Fig. 14, the arm 203 is generally parallel with the direction of movement of the slide and the clamping jaws 209 and 210 of the latter will be spaced. On further movement of the bar 109 to carry its high side upwardly, the bell crank 221 will be rocked to move the roller 220 inwardly toward the slide and rock the lever 203, compressing the spring 206, and shifting the jaw 209 away from the jaw 210 thus opening the jaws for the reception of work.

When the position of bar 109 is reversed, that is when its lower side is upwardly, the spring 206 acts on the arm or lever 203 and causes the head 219 to follow and keep in contact with the roller 220 and at the same time, lever 203 being rocked on pivot 204, the jaw 209 is carried toward the jaw 210 so that a piece of work will be clamped between these jaws. The timing relationship of the action just described, with respect to the remaining operations of the machine, will be fully set forth in a later part of the description.

Pulley 56 is freely turnable about cam shaft 52 but at predetermined times is connected thereto through the one revolution clutch means 72, as for example a so-called "Hilliard single revolution clutch." Such clutch means (see particularly Figs. 22, 23 and 24) includes a hollow drum 225 having a hub-portion 225a freely turnable on the shaft 52 and having the pulley 56 fixed thereto.

Extending within the drum 225 is a core portion 226 keyed to the shaft 52 as by a key 227. Fixed to the outer end portion of core 226 is a plate 228 and between such plate and the drum 225 is a plate 229 carrying a cage device 230 carrying the rollers 230a. A key 230b has plate 228 pivoted thereto at 230c and at 230d has a pivotal connection with the plate 229. A short set screw 230e locks the core 226 to the key 227 while a screw 230f secures the plate 228 to such core. Anchored at its respective ends to the plates 228 and 229 is a coil spring 230g. Plate 229 has a shoulder 230h.

Pivoted at 231 is a pawl or bell-crank 231a having an arm connected with a solenoid 231b. In Fig. 4 the pawl is shown as having an arm in engagement with the shoulder 230h of the plate 229 and the other arm of the pawl is connected with the solenoid. When the pawl is in the position of Fig. 4, the cam shaft 52 is stationary and the machine has just finished a cut.

To start the machine, a switch is closed energizing solenoid 231b and the latter shifts the pawl 231a to released position releasing the disc 229 so that rotation of the cam shaft 52 by the pulley 56 begins. When the pawl is shifted as suggested the spring 230g rocks the plate 229 and the cage 230 shifting the rollers 230a to bind between the drum 225 and the core 226 whereby the core and drum will rotate as a unit and the shaft 52 will be driven. At the end of a complete revolution of the cam shaft, the solenoid 231b having been de-energized, pawl 231a again engages the shoulder 230h of the disc 229 and the machine is stopped, a piece having been cut from the work. As the pawl is again engaged by shoulder 230h the cage 230 is held and the core moves with the shaft and instantly the core and drum are disconnected and rotation of the cam shaft ceases. It will be understood that when the cam shaft is stopped as described, the motor 23 continues to operate so that the disc 16 is being rotated and the motor 59 continues to operate so that the pulley 56 is being rotated with the drum 225.

Located below the V-blocks in the path of movement of the cut-off disc 16 is a button-like piece 232 carried in an arm 233 comprising part of a bent rod which also includes a portion 234 disposed horizontally and mounted for turning movement in a bearing or housing 235 and a vertically extending portion 236 having its upper free end in engagement with the operating button of a micro switch 237. Switch 237 is a normally closed switch but is held open by the arm 236, as such arm, and in fact the entire rod comprising said arm as well as arm 233 and portion 234, are biased by a torsion spring 238. When the disc 16 passes through a piece of work and engages the button 232 the latter is depressed, rocking downwardly the arm 233 and rocking laterally the arm 236 against the tendency of the spring 238 so that the micro switch 237 is permitted to close. The operation of this switch as well as the operation of switch 83 will further be described when a complete description of the operation of the machine is undertaken.

About the wheel or cut-off disc 16 is a metal housing 240 having a slot 241 in one side wall and through which the mounting for the wheel 16 passes. This slot permits of vertical movement of the wheel and a shell device 242 carried by the wheel mounting serves to maintain said slot closed in various positions of the wheel. A liquid coolant is constantly supplied to the work held in the V-block and a small motor 243 drives the pump 244 taking the liquid from any suitable source, as the tank 239, and from a pipe 245 pumps the liquid up through pipe 246 and 247 to a pipe or nozzle 248 extending through coverings or plates 249 in the front wall of the housing 240. A door 250 in the front wall of the base section 11 gives access to the interior of such section for the purpose of making adjustments or otherwise.

The way 113 also mounts a guard means comprising sections 251 and 252. Each of these guard devices or housing units is generally U-shaped in transverse section (see Figs. 2, 7 and 14) and the slide 112 has a similarly shaped opening 253 therethrough. When the slide is in one extreme position, as in Fig. 7, the casing 251 extends entirely through the slide and it will be clear from the same figure that as the slide is moved toward the left it will receive all or part of the casing unit 252, depending on the extent of movement of the slide. As shown, the slide is in its extreme position in Fig. 7 and the cylinder 103 passes through the end wall 254 of the casing 252. The top wall of such casing unit is hinged as at 255 whereby the casing may be opened to give access to the stop device including the bracket 191 whereby the desired adjustment of the stop device may be made.

Since the circuits employed are very simple, no wiring diagram has been shown. However, on a panel 256 (see Fig. 1) there are mounted the various control switches of the machine and these include a switch 257 controlling the motor 243 of the coolant pump, a so-called jogging button 258, the start and stop swith 259 for the motor 23, the start and stop switch 260 for the motor 48 and the switch means 261 including start, stop and jog buttons for the cam shaft motor 59.

When setting the machine up for any particular piece of work the cam shaft may be given an intermittent movement through the jog button or switch means 261 or by hand wheel 262 fixed on the shaft 52 at the outer side of the frame part 11. After the proper adjustments have been made, the cutting wheel 16 is pushed upwardly until the collar 86 and the element 93 are at the upper end of the lift bar 79.

At this time the work is being held in the V-blocks by the clamping hooks 120 and the feeding clamp means is released from the work although the slide 112 remains stationary and is in its inner or forward position. When the cam 68 reaches a position so that the roller 75 of the arm 76 is free to move upwardly in the cam path 74 as to the position of Fig. 18, movement of the cam shaft ceases and the arm 24 and parts thereon, including the wheel 16, rocks downwardly carrying the wheel toward the work.

As the cam 68 remains stationary at this time, the rod 79 is moved downwardly as the cutting assembly gravitates about the pivot 25 under the control of the dash pot 32 and the wheel engages the work. The downward movement of the wheel may not be sufficient to cut entirely through the work. This will be owing to the fact that the wheel has been pushed to its uppermost position.

The machine is permitted to operate so that the wheel cuts as far as it may and then the jog button 258 is pressed and energizes the solenoid 91 to operate the means 93 and permit of lowering of cutting assembly a predetermined amount on the rod 79. Button 258 may be operated to jog the machine as many times as necessary to have the wheel cut entirely through the work and to have the wheel engage the button 232 at the underside of the work.

Now the machine is ready to continue its own operations once the wheel has cut through a piece of work and engaged said button 232. As the cut is finished the path 74 in the cam 68 takes control of the roller 75 on the arm 76 and shifts the same downwardly thus shifting bar 79 upwardly together with the entire cutting assembly and raising the cutting wheel up out of the work.

Not until after the wheel is free of the work, but while the wheel is still moving upwardly, the hydraulic means functions to shift the carriage 112 back along the way 180 until such carriage again engages the stop 192. At this point the cam 69 operates to elevate the yoke or fork 107 and thus rock the bar 109 about its eccentric mounting whereby the bell crank member 221 may rock outwardly on its pivot 222 and the spring 206 may function to cause the clamping element or arm 203 to turn about its pivot 204 and bring its jaw 210 into clamping relation with the work. Thus the feed grips are now closed on the work.

Next the hook bolts 120 are released by the timed operation of the cam 71 and thereafter the slide 112 is given its forward movement to carry the work forwardly in the V-blocks. As the work is carried forwardly by the movement of the slide, the forward end of the work piece will push the previously cut off piece from the V-blocks and it may be removed from the machine manually or automatically, as desired. The forward feed of the slide continues until the front stop is reached and this stop comprises a hardened insert 262a in the V-blocks and positioned to be engaged by the leading or forward end of the piston rod 173, the end portion 264 of which makes the engagement and projects through the inner end of the slide 112, as best shown in Fig. 11.

The end of the forward movement having been reached, the hook bolts 120 are drawn downwardly to engage the work, this operation being caused by the feed of the cam 70 and thereafter the feed grips, including the portions 201 and 202, are released from the work as the cam 69 raises the yoke 107 to rock the eccentric mounting bar 109 and have it through the roller 224 pivot the bell crank 221 on the pivot 222 and press inwardly on the free end portion of the arm 203 compressing the spring 206 and moving the jaw 209 away from the work.

At this time cam 68 is moved into a position wherein the sharp rise (see Fig. 18) comes below the roller 75 on the lever 76 so that such lever is no longer supported and it permits the entire cutting assembly to fall downwardly by gravity about the pivot 25. The weight of this downward fall is controlled by the dash pot 32 so that the wheel does not hit the work in any such manner as to rebound or shatter, and the wheel starts to cut its way down through the work being fed by gravity, as the weight 263 together with the weight of the forward portion of the cutting mechanism overbalances the weight 26 at the rear of pivot 25.

At this time the cam shaft has moved one complete revolution and now the one revolution clutch 220 is stopped since its tooth or shoulder 230h has again come against the end of the bell crank or pawl 231a. The wheel continues to cut down through the work and engages the button to energize the solenoid 231b. This rocks the pawl 231a and releases the one revolution clutch so that the pulley 56 is again driving the cam shaft through the one revolution clutch and the cycle of operation begins over the wheel being elevated, the slide being moved out or back, the work being clamped, etc.

The extension 81 on the arm 79 occupies a constant relation to said arm and the arm is always lowered a predetermined amount or through a definite up and down movement. The movement of the wheel depends on the place or connection of its mounting arm 24 with the bar 79. Thus, when this bar comes down, the wheel may engage the button 232 to energize solenoid 231b before the extension 81 closes the switch 82.

However, when the wheel has worn so that it does not engage the button 232 there is no start of the next movement or cycle of operation of the machine. At such time downward movement of the bar 79 brings its extension 81 into position closing the switch 82 and this energizes the solenoid 91 to shift the means 92 and bring about a downward movement of the wheel 16 and its supporting structure relative to the bar 79. This lets the wheel engage the button to operate solenoid 231b and continue the machine's operating cycle. In connection with the solenoid 91 and means 93, it is noted that the feed or movement of arm 86 downwardly with respect to bar 79 is in each instance such that the wheel is lowered an amount greater than the utmost wear of the wheel in the making of any single cut.

It is pointed out that in a machine of this type there is no particular relation between the time required for the wheel to cut through a piece of work and the time required to shift the work to bring a new piece in position for cutting by the wheel. Therefore in this machine, I provide the one revolution clutch 72 and its controls so that there is a definite timing for movement of the slide back and forth, for movement of the clamping hooks 120, opening and closing of feed clamping means and the raising of the cutting wheel to its upper position.

After all this has been accomplished the clutch 72 is disconnected from the cam shaft so that although the motor 59 remains in operation during cutting of a piece of work, the cam shaft remains stationary and the wheel 16 creates its own time in cutting through the work. If it is a small piece of work, the wheel cuts through it in a very short time and engages the button 232 and starts the cycle of operation of the entire machine. Where a larger diameter piece of work is concerned the wheel takes more time to get through it and consequently the cam shaft remains stationary for a longer time. The cams are so cut as to make all parts of the releasing, feeding and clamping cycle fixed, but this cycle is timed for itself and is apart from any time that may be consumed by the wheel going through the work. In other words, the wheel itself engages the button 232, sets in operation the machine's pre-determined cycle and is, in effect, a timing device.

In connection with the slide 112 and the way 113, attention is particularly invited to Fig. 15. There it is shown that the way 113 is inclined so that as the slide moves toward the V-blocks the end of the work is raised. The actual inclination is very slight but it is sufficient to raise the work from contact with the V-blocks as the work is moved forward. This saves wear of the V-blocks such as would be occasioned by constant sliding of work over the V-blocks if the ways 113 were not inclined.

Having thus set forth the nature of my invention, what I claim is:

1. In an abrasive cut-off machine, a work support, an arm extending over said support, an abrasive cut-off wheel on said arm, means for rotating said wheel, means pivoting said arm for rocking movement to carry said cut-off wheel towards said support, cam controlled means for moving work to said support, cam controlled means for clamping work on said support, cam controlled means for rocking said arm to move said wheel away from said support, means for operating all of said cam controlled means in predetermined order, and means associated with said support and adapted to be engaged by said cut-off wheel to start a cycle of operation of said cam means.

2. In an abrasive cut-off machine, a work support, an abrasive cut-off wheel, means mounting said wheel for movement toward said support to cut work thereon, means operable through a definite cycle to feed a piece of work to said support, clamp the work against said support, start the wheel toward said support and then stop, and means controlled by said wheel when it has cut through a piece of work on said support to again start the first mentioned means through said cycle of operation.

3. In an abrasive cut-off machine, a work support, an abrasive wheel, means mounting said wheel for movement toward and from said support, a slide, work grips on said slide, work clamps associated with said support, a cam shaft, cams on said shaft and controlling respectively movement of said slide, operation of said grips and operation of said work clamps, means driving said cam shaft, said means including a driving motor and a one revolution clutch operable to permit of driving of said cam shaft by said motor to operate a means to move the abrasive wheel away from the work support, to release the work grips on the slide, to move the slide outwardly along the work, to cause said grips to engage the work, to then move the slide inwardly to feed the work over said work support and to then cause the work clamps to engage the work and hold it against said support, and to then disconnect the driving motor from the cam shaft, said means for moving the cut-off wheel away from the work operable to release the cut-off wheel for movement toward the work on the completion of the revolution of the cam shaft, and means under said work support and adapted to be engaged by said cut-off wheel when the latter has passed through a piece of work to cause release of said one revolution clutch to start a second revolution of the cam shaft and thus a second cycle of operation of the machine.

4. An abrasive cut-off machine, a work support, an abrasive cut-off wheel, means mounting said wheel for movement toward and from the work support to cut through a piece of work on the latter and to then recede, a bar, a cam for controlling movement of said bar through definite lengths, means connecting said bar with said wheel to control movements thereof toward and from the work support, said means comprising an adjustable connection, and means operable to shift the point of such connection to further the movement of the wheel toward the work support on the stopping of such movement of the wheel short of a predetermined movement toward such support.

5. In an abrasive cut-off machine, a work support, an abrasive cut-off wheel, means mounting said wheel for movement toward and from said support, means for feeding work to said support, said last means comprising a slide, a cylinder, a piston in said cylinder and connected with said slide, a pump cylinder connected at its respective ends with the respective ends of the first cylinder, a piston in said pump cylinder, a cam, means for rotating said cam, means operated by said cam for reciprocating the piston in the pump cylinder in predetermined timed relation to have said pump cylinder supply fluid under pressure to the first mentioned cylinder alternately at the respective sides of the piston in the latter to move said slide first in one direction and then in the opposite direction as the piston is reciprocated in the pump cylinder.

6. In a cut-off machine, a work support, means to automatically feed work to said support and to then stop, a cut-off wheel movable toward and from said work support, means to start the first mentioned means into operation on said cut-off wheel passing through a piece of work on said support, and said last means including a control device positioned to be engaged by said cut-off wheel when the latter has passed through a piece of work.

7. In an abrasive cut-off machine, a work support, an abrasive cut-off wheel, means mounting said wheel for movement toward and from work on said support to cut through a piece of work and then recede from the support, a bar, an adjustable connection between the wheel and bar, said bar controlling movements of said wheel toward and from said support, and means operable to adjust said connection to permit of further movement of the wheel toward the support on stopping of such a movement of the wheel short of a predetermined movement in the direction of the support.

8. In an abrasive cut-off machine, a work support, hydraulic means to automatically feed work to said support and to then stop, a cut-off wheel movable toward and from said work support, a control means positioned to be engaged by said cut-off wheel on the latter passing through a piece of work on said support, said control means when engaged by said wheel adapted to first move the wheel back from the work and then start the hydraulic means into operation, said hydraulic means comprising a work carrying slide, a piston and cylinder construction connected to move said slide first in one direction and then in the opposite direction, and means supplying fluid under pressure alternately to opposite ends of the cylinder of said construction.

9. In an abrasive cut-off machine, a work support, hydraulic means to automatically feed work to said support and to then stop, a cut-off wheel movable toward and from said work support, means to start the hydraulic means into operation on said cut-off wheel passing through and receding from a piece of work on said support, said hydraulic means comprising a work carrying slide, a piston and cylinder construction connected to move said slide first in one direction and then in the opposite direction, a pump for supplying fluid under pressure first to one end of said cylinder and then to the other end thereof, a cam shaft, and a cam on said shaft and connected to operate said pump.

10. In an abrasive cut-off machine, a work support, clamping bolts for holding work against such support, a cut-off wheel movable toward and from said work support, means to move said clamping bolts to and from clamping relation with work on said support, said means including a cam shaft and cam, articulated lever means operated from said cam, and said lever means including a spring adapted to yield on attempt to transmit an excessive pressure from the cam through such lever means whereby the spring controls the maximum pressure with which the clamps may be brought against the work.

11. In an abrasive cut-off machine, a work support, a work carrying slide for moving work to said support, a work clamp on said slide and comprising a pair of jaws adapted to be opened for receiving work and to be thereafter closed on the work, cam means for opening said jaws, spring means for closing said jaws, and a cut-off wheel movable toward and from said work support.

12. In an abrasive cut-off machine, a work support, a cut-off wheel movable toward and from said work support, a slide for carrying work to said support, a work clamping means on said slide and comprising a pair of jaws adapted to be opened to receive work and to be closed to clamp the work, cam controlled means for shifting said slide toward said work support to carry work thereto and to move the slide away from the work support to have it engage a new portion of the work, means for causing said jaws to grip the work when the slide has been moved away from said work support, other cam controlled means for opening said jaws when the slide has moved the work to the support, and means whereby said cam controlled means will start in operation on said cut-off wheel passing through a piece of work on said support.

13. In an abrasive cut-off machine, a work support, a cut-off wheel movable toward and from said work support, a slide for carrying work to said support, a work clamping means on said slide and comprising a pair of jaws adapted to be opened to receive work and to be closed to clamp the work, cam controlled means for shifting said slide toward said work support to carry work thereto and to move the slide away from the work support to have it engage a new portion of the work, spring means for causing said jaws to grip the work when the slide has been moved away from said work support, other cam controlled means for then opening said jaws on the slide being moved toward the work support, and means whereby both said cam controlled means will start in operation on said cut-off wheel passing through a piece of work on said support.

14. In an abrasive cut-off machine, a work support, a cut-off wheel movable toward and from said work support, a slide for carrying work to said support, a work clamping means on said slide and comprising a pair of jaws adapted to be opened to receive work and to be closed to clamp the work, means for shifting said slide toward said work support to carry work thereto and to move the slide away from the work support to have it engage a new portion of the work, spring means for causing said jaws to grip the work when the slide has been moved away from said work support, cam controlled means for then opening said jaws on the slide being again moved toward the work support, means whereby said cam controlled means will start in operation on said cut-off wheel passing through a piece of work on said support, said jaws each including a mounting portion, blocks on said mounting portion adjustable thereon toward and from one another, and jaw plates on the opposing surfaces of said blocks.

15. In an abrasive cut-off machine, a work support, an abrasive cut-off wheel, means mounting said wheel and movable toward and from said support to cut through a piece of work thereon and then recede from the support, a bar, an adjustable connection between the wheel and bar, said bar controlling movements of said wheel toward and from said support, said connection between the bar and wheel comprising teeth on said bar, toothed means interlocking with the teeth of said bar, a solenoid and spring for shifting said tooth means first in one direction and then in the other on energizing and de-energizing of said solenoid, said toothed means on being shifted by said solenoid and spring bringing about relative movement of the wheel and bar to permit of further movement of the wheel toward the work support for the same movement of the bar, and means for energizing said solenoid on stopping of the movement of the wheel short of movement through work on said support.

16. The combination as in claim 15 wherein said bar is toothed at opposite edges and wherein said toothed means comprises a pair of toothed dogs engaged with the respective edges of the bar, the relative arrangement of the parts being such that when the teeth of one dog are engaged with the teeth of one side of the bar the teeth of the other dog are released from the teeth of the bar, and the widths and locations of the teeth of the bar and dogs being such that as said dogs are shifted by the solenoid the wheel is lowered one-half of a tooth width with respect to the bar and as the dogs are shifted by the spring the wheel is lowered an additional one-half of a tooth width relative to the bar.

17. In an abrasive cut-off machine, a work support, a way at one side of said support, a slide on said way and movable thereon toward and from the work support, said slide on its movement toward the work support adapted to carry work to the latter, and said way inclined toward said support whereby as the slide moves toward the support the work is slightly elevated from the latter and does not slide thereon.

18. In an abrasive cut-off machine, a work support, a way at one side of said support, a slide on said way and movable thereon toward and from the work support, a work clamp on said support including a pair of jaws adapted to be opened to receive work and to be closed to grip the work, means maintaining said jaws open while the slide is moving from the work support, means to close said jaws to have them grip the work at the end of such movement of the slide, said slide on its movement toward the work support adapted to carry work to the latter, and said way inclined toward said support whereby as the slide moves toward the support the work is slightly elevated from the latter and does not slide thereon.

19. The combination as in claim 18 wherein cam means maintain said jaws open during outward movement of the slide and spring means maintain said jaws in gripping relation with the work during inward movement of the slide.

20. In a cut-off machine having a cutting station, an abrasive cut-off wheel, means mounting said wheel for gravitational movement toward said station to cut work, means operable through a definite cycle to feed a piece of work to said station, means to grip and hold the work at said station, start the wheel toward said station and then stop while the wheel moves by gravity toward said station, and means operable when said wheel has cut through a piece of work at said station to again start the first mentioned means through said cycle of operation.

21. In a cut-off machine having a cutting station, an abrasive cut-off wheel, means mounting said wheel for movement toward and from said station, a slide, work grips on said slide, means for gripping and holding work at said station, a cam shaft, means on said shaft for controlling respectively movement of said slide, operation of the grip on the slide and operation of said means for gripping and holding the work at the station, means driving said cam shaft, said means including a driving motor and a one revolution clutch operable to permit of driving of said cam shaft by said motor to operate a means to move the abrasive wheel away from the cutting station, to release the work grips on the slide, to move the slide outwardly along the work, to cause said grips to engage the work, to then move the slide inwardly to feed the work to said cutting station and to cause the means for gripping and holding the work at the station to engage and hold the same, and to then disconnect the driving motor from the cam shaft, said means for moving the cut-off wheel away from the work operable to release the cut-off wheel for movement toward the work on completion of the revolution of the cam shaft, and means at one side of said cutting station and adapted to be engaged by said cut-off wheel when the latter has passed through a piece of work to cause release of said one revolution clutch to start the second revolution of the cam shaft and thus a second cycle of operation of the machine.

22. In a cut-off machine, a cutting station, means for gripping and holding work at said station, means to automatically feed work to said means for gripping and holding the work and to then stop, a cut-off wheel movable toward and from said station, means to start the second mentioned means into operation on said cut-off wheel passing through a piece of work on said support, and said last means including a control device positioned to be engaged by said cut-off wheel when the latter has passed through a piece of work.

23. In a cut-off machine, a work support, means to automatically feed work to said support and to then stop, a cut-off wheel movable toward and from said work support, electrically operated means to start the first mentioned means into operation on said cut-off wheel passing through a piece of work held by said support, and said electrical means including a control means positioned to be engaged by said wheel on the same passing through a piece of work held by said support.

24. In a cut-off machine, a cutting station, means to support work at said station, means to automatically feed work to said support and to then stop, a cut-off wheel movable toward and from said work support, means to start the first mentioned means into operation on said cut-off wheel passing through a piece of work on said support, said last means including an electrically controlled device positioned to be engaged by said cut-off wheel when the latter has passed through a piece of work.

25. In a cut-off machine, a work support, means to automatically feed work to said support and to stop, a cut-off wheel movable toward and from said work support, and electrical means including a switch means positioned to be engaged by said wheel to start the first mentioned means into operation on said cut-off wheel passing through a piece of work held by said support.

26. In an abrasive cut-off machine having a cutting station, an abrasive cut-off wheel, means mounting said wheel for movement toward and from said station to cut through a piece of work at the latter and to then recede, means connected with said wheel to control movements thereof toward and from the cutting station, a cam for controlling movement of said means connected with said wheel, said means connected with said wheel including an adjustable connection, and means operable to adjust said connection to further the movement of the wheel toward the cutting station on the stopping of such movement of the wheel short of a predetermined movement toward such station.

27. In an abrasive cut-off machine including a cutting station, an abrasive cut-off wheel, means mounting said wheel for movement toward and from work at said station to cut through a piece of work and then recede from the station, means controlling movements of said wheel toward and from said station, said means including an adjustable connection, and means operable to adjust said connection to permit of further movement of the wheel toward the station on stopping of such a movement of the wheel short of a predetermined movement in the direction of the station.

28. In an abrasive cut-off machine having a cutting station, an abrasive cut-off wheel, means mounting said wheel for movement toward and from said station to cut through a piece of work at the latter and to then recede, means connected with said wheel to control movements thereof toward and from the cutting station, a cam for controlling movement of said means connected with said wheel, said means connected with said wheel including an adjustable connection, and electrically operable means to adjust said connection to further the movement of the wheel toward the cutting station on the stopping of such movement of the wheel short of a predetermined movement toward such station.

29. In an abrasive cut-off machine including a cutting station, an abrasive cut-off wheel, means mounting said wheel for movement toward and from work at said station to cut through a piece of work and then recede from the station, means controlling movements of said wheel toward and from said station, said means including an adjustable connection, and electrically operable means to adjust said connection to permit of further movement of the wheel toward the station on stopping of such a movement of the wheel short of a predetermined movement in the direction of the station.

30. In a cut-off machine having a cutting station, a cut-off wheel, means mounting said wheel for movement toward said station to cut work, means operable through a definite cycle to feed a piece of work to said station, means to grip and hold the work at said station, start the wheel toward said station and then stop, and electric switch means located to be engaged and actuated by said wheel when it has cut through a piece of work at said station to again start the first mentioned means through said cycle of operation.

HARRY G. ROBINSON.

REFERENCES CITED

The following references are of record in the file of this patent:

UNITED STATES PATENTS

| Number | Name | Date |
|---|---|---|
| 344,777 | Griswold | June 29, 1886 |
| 1,341,818 | Onsrud | June 1, 1920 |
| 2,397,974 | Morrow et al. | Apr. 9, 1946 |